Nov. 16, 1926.  1,606,877
A. HOWE
FISHHOOK
Original Filed March 24, 1923
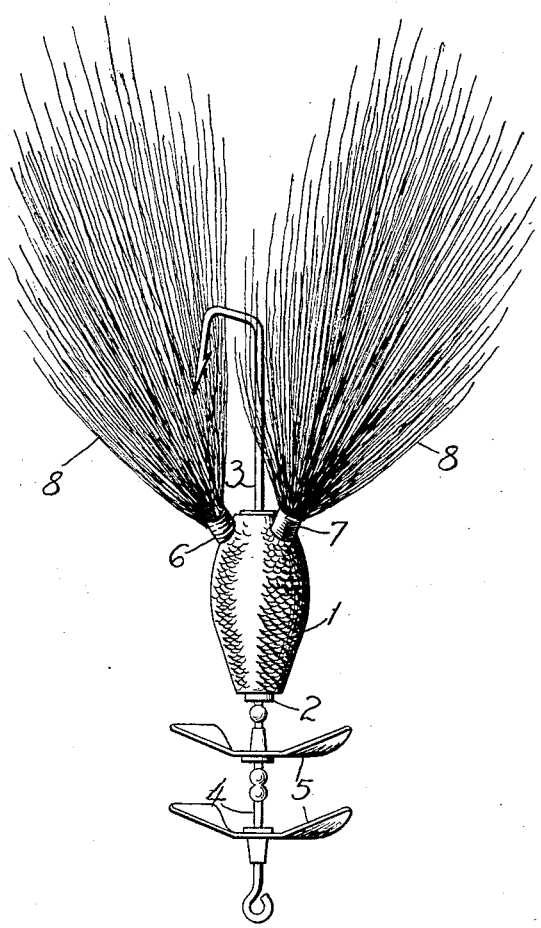
INVENTOR
A. Howe
BY H.J. Sanders
ATTORNEY Patented Nov. 16, 1926.

1,606,877

UNITED STATES PATENT OFFICE.

ALONZO HOWE, OF WARSAW, INDIANA.

FISHHOOK.

Refiled for abandoned application Serial No. 627,470, filed March 24, 1923. This application filed February 23, 1926. Serial No. 90,228.

This invention relates to improvements in fish hooks and has for its principal object to provide a hook having a guard that will protect it from weeds, rushes, etc., and that will not in any way interfere with the strike of the fish. More specifically the invention consists in the combination and arrangement of parts to be hereinafter fully described, pointed out in the appended claims and illustrated in the accompanying drawing which forms a part of this application.

The figure is a view of my improved fish hook in perspective.

The reference numeral 1 denotes a float provided with the usual core 2 and carrying the hook-shank 3 and leader 4 whereon the spoons 5 are arranged. Spaced apart and carried at the hook-end of the float 1 are the stems 6, 7 provided with threaded roots that are firmly embedded in the body of the float whereby the stems are rigidly retained in position. The stems are so positioned that they diverge from each other as they extend outwardly from the float and they are arranged upon opposite sides of the shank of the hook, the hook rising substantially above said stems as the float lies in the water.

Each stem carries a bunch of hair or bristles 8 which serve as guards for the hook and effectually ward off weeds, rushes etc. as the hook is drawn through the water.

What is claimed is:—

1. The combination with a hook, of a float upon the shank thereof, stems carried by said float, and a plurality of guards carried by said stems and disposed laterally of said hook.

2. The combination with a hook, of a float upon the shank thereof, stems carried by said float upon opposite sides of said shank, said stems diverging as they extend outwardly from said float, and a plurality of bristle guards carried by each stem and disposed laterally of said hook.

In testimony that I claim the foregoing as my own I have hereto affixed my signature.

ALONZO HOWE.